(12) United States Patent
Härmä et al.

(10) Patent No.: US 7,072,406 B1
(45) Date of Patent: Jul. 4, 2006

(54) SERIAL INTERFACE AND METHOD FOR TRANSFERRING DIGITAL DATA OVER A SERIAL INTERFACE

(75) Inventors: Esa Härmä, Salo (FI); Jouko Häkkänen, Salo (FI)

(73) Assignee: Nokia Mobile Phones Ltd., Espoo (FI)

( * ) Notice: Subject to any disclaimer, the term of this patent is extended or adjusted under 35 U.S.C. 154(b) by 973 days.

(21) Appl. No.: 09/655,328

(22) Filed: Sep. 5, 2000

(30) Foreign Application Priority Data

Sep. 6, 1999 (FI) ............................................. 19991900

(51) Int. Cl.
*H04B 3/00* (2006.01)
*H04L 25/00* (2006.01)

(52) U.S. Cl. ....................... 375/257; 375/293; 375/286; 375/288; 348/495

(58) Field of Classification Search ................. 375/257, 375/256, 286, 293, 294, 219, 220, 222, 259, 375/295, 316, 364, 288, 282, 361, 287; 348/495–496
See application file for complete search history.

(56) References Cited

U.S. PATENT DOCUMENTS

| | | | | |
|---|---|---|---|---|
| 3,863,025 A | * | 1/1975 | Gonsewski et al. | 375/282 |
| 4,442,528 A | * | 4/1984 | Fukuda | 375/293 |
| 5,086,340 A | * | 2/1992 | Citta et al. | 348/21 |
| 5,416,524 A | * | 5/1995 | Citta et al. | 348/471 |
| 5,534,938 A | * | 7/1996 | Citta et al. | 348/495 |
| 5,987,070 A | * | 11/1999 | Fimoff et al. | 375/286 |
| 6,567,476 B1 | * | 5/2003 | Kohl et al. | 375/293 |

FOREIGN PATENT DOCUMENTS

| | | |
|---|---|---|
| GB | 2180712 | 4/1987 |
| WO | WO 98/05139 | 2/1998 |

OTHER PUBLICATIONS

Patent Abstracts of Japan, Publication No. 04035535—English translation of the abstract enclosed.
Patent Abstracts of Japan, Publication No. 07038553—English translation of the abstract enclosed.

* cited by examiner

*Primary Examiner*—Phuong Phu
(74) *Attorney, Agent, or Firm*—Perman & Green, LLP (57) ABSTRACT

A digital serial interface connects a transmitting device with a receiving device for communicating both data bits and synchronization signals via the serial interface. The transmitting device include a primary transmitter for converting a serial sequence of the data bits into successive data signal levels, and further includes a secondary transmitter for converting synchronization signals into synchronization signal levels different from the levels employed for the data signals. The receiving device has a primary receiver for the data signal levels for converting a sequence of data signal levels into a serial sequence of data bits, and further includes a secondary receiver fir the synchronization signal levels for converting synchronization signal levels into synchronization signals.

20 Claims, 9 Drawing Sheets

SERIAL INTERFACE AND METHOD FOR TRANSFERRING DIGITAL DATA OVER A SERIAL INTERFACE

TECHNOLOGICAL FIELD

The invention concerns generally the technology of transferring structured digital data over a wired connection. Especially the invention concerns the technology of encoding the synchronization information needed for maintaining the structures of the digital data in a wired serial interface.

BACKGROUND OF THE INVENTION

For transferring digital data between circuit elements the basic approaches of parallel and serial interfacing are available. A parallel interface consists of a number of parallel wired connections or lines so that a number of bit values may be transferred simultaneously by setting either the logical value "1" or the logical value "0" to each line, i.e. either setting or resetting each line simultaneously. A serial interface does not necessarily involve more than one data line on which the bit values are transferred sequentially by repeatedly either setting or resetting the data line.

The situation gets somewhat more complicated if the signal to be transmitted must conform to a certain higher-level structure, meaning that there are relatively long data sequences that must be handled independently from each other. In this patent application we will especially describe the transmission of digital image data over an interface. A digital image consists nearly always of a rectangular array of elementary picture elements or pixels. The image is read by scanning the horizontal lines formed by adjacent pixels in a prescribed order, usually from top to down and from left to right. In the resulting digital bit stream a predetermined number of bits describes the color of each pixel, the beginning of a line is indicated by a certain line synchronization or LSYNC signal and the beginning of a new image frame is indicated by a certain frame synchronization or FSYNC signal.

In order for the image transmission to function properly the transmitting device and the receiving device must share a common clock frequency for writing on and reading from the interfacing lines. Additionally the transmitting device must correctly convey the LSYNC and FSYNC signals to the receiving device in one way or another.

Figure 1:
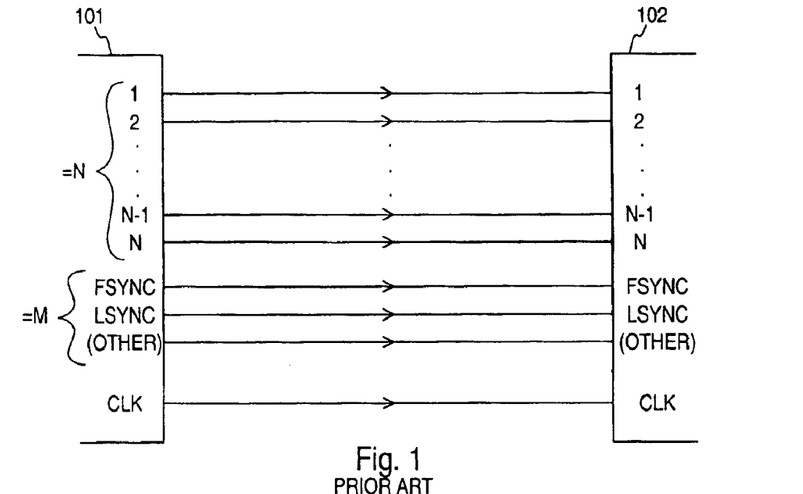
FIG. 1 illustrates a known parallel interface.

FIG. 1 illustrates a conventional parallel interface between a transmitting device 101 and a receiving device 102. The interface consists of a number of data lines, which are here numbered from 1 to N, a number of control lines and a clock line CLK. The number of control lines is shown to be M, and because we discuss especially the transmission of digital image data, among the control lines there are the synchronization lines FSYNC and LSYNC.

Figure 2A:
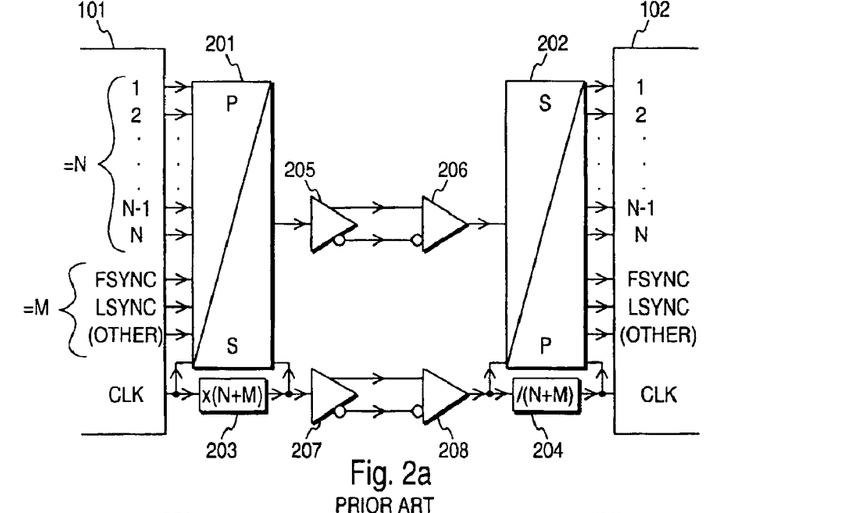
FIG. 2a illustrates a known serialized parallel interface.

FIG. 2a illustrates schematically how the interface between devices 101 and 102 may be "serialized". A parallel to serial (P/S) converter 201 is coupled to the parallel output of the transmitting device 101, and a corresponding serial to parallel (S/P) converter is coupled to the parallel input of the receiving device 102. A phase locked frequency multiplier 203 is utilized to multiply the frequency of the clock signal CLK coming from the transmitting device by N+M. The basic clock frequency CLK drives the parallel side of the P/S converter 201 and its N+M-multiplied version drives the serial side. Correspondingly a frequency divider 204 is used to restore the original CLK frequency at the receiving end so that the received N+M-multiplied clock frequency drives the serial side of the S/P converter and the original CLK frequency drives the parallel side. The original CLK frequency is also provided to the receiving device 102 for synchronizing the reading of the parallel input data. In addition to just converting the interface into serial form FIG. 2a illustrates how the immunity of the data and clock lines against common-mode interference may be enhanced by using differential transmitter-receiver pairs 205, 206 and 207, 208 respectively. For short differential transmission links e.g. between two integrated circuits within a single electronic apparatus it is commonplace to use so-called low-level differential transmitters and receivers so that the differential voltage levels appearing in the serial connection are well under the conventional +5V . . . −5V levels.

Figure 2B:
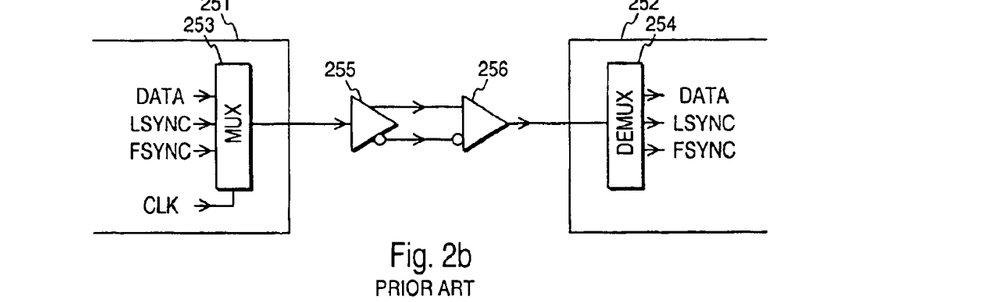
FIG. 2b illustrates a known serial interface.

FIG. 2b illustrates the basic serial interface model where a transmitting device 251 needs only one connection to the receiving device 252. The transmitting device 251 comprises a multiplexer 253 that multiplexes the bits of the DATA, LSYNC and FSYNC digital signals into a common connecting line in the pace determined by a clock signal CLK. In the receiving device 252 there is a corresponding demultiplexer 254. In FIG. 2b the actual wired connection between the transmitting end and the receiving end is also shown to be differential, utilizing the differential transmitter 255 and the differential receiver 256. The LSYNC and FSYNC bit sequences that are multiplexed into the common connection must consist of bit patterns that are long enough so that their composition can be selected to be unique: when the demultiplexer 254 recognizes a certain predetermined pattern of consecutive bits in the received bitstream, it indicates that a synchronization signal has been received. We may refer to a number of consecutive bits as N, and denote the number of synchronization bits constituting the LSYNC and FSYNC patterns therein as M.

If the clock frequency of an interface is kept constant and not converted to higher values, a parallel interface is more effective in terms of throughput since N+M bits are transferred on each cycle of the basic clock frequency CLK. However, modern VLSI (Very Large Scale Integration) technology has made it possible to integrate so many different functions on a single semiconductor chip that the number of input and output lines to and from the chips has become a limiting factor. Serial interfaces do not need even nearly as many lines as parallel ones, which makes serializing an important aspect in modern circuit design.

The drawback of the arrangements of FIGS. 2a and 2b is that for a fraction M/(N+M) of the time the serial interfacing line is not transferring actual data or payload information, since it is used for transmitting control information. For example in FIG. 2a a feasible choice for values of M and N in practice could be M=2 and N=8, which would mean that only 80% of the active communication time is used for transmitting actual data. An additional drawback is the relatively high clock frequency, N+M times CLK, which is required to operate the converters and to time the transmission over the serial line(s). Usually the power consumption of converter devices is directly proportional to their operating frequency, and especially in small-sized portable electronic apparatuses all power consumption should be kept at minimum. Additionally a high clock frequency in a serial interface increases the amount of electromagnetig interference (EMI) caused to the surrounding circuitry.

The arrangements of FIGS. 2a and 2b is also susceptible to synchronization errors. The S/P converter in FIG. 2a is basically a parallel array of memory locations. A bit value is read from the serial line at each cycle of the multiplied clock frequency and written into a certain memory location. At the next cycle of the basic CLK frequency the data in the memory locations is latched into the parallel lines. If the writing started from an incorrect memory location, or if a distortion in the multiplied clock frequency line somehow erased one or more cycles of the multiplied clock frequency, the receiver may not get a correct result. The same applies if a bit is lost or inverted in the synchronization patterns required by the solution of FIG. 2b.

SUMMARY OF THE INVENTION

It is an object of the present invention to provide a method and an arrangement for conveying control information over a serial interface with a better efficiency in communication time utilization than in the described prior art arrangements. It is a further object of the invention to provide a serial interface arrangement with lower power consumption than in the described prior art arrangements. An even further object of the invention is to provide a method and an arrangement for conveying control information over a serial interface with less EMI being caused. An additional object of the invention is to provide a method and an arrangement for conveying control information over a serial interface with less susceptibility to synchronization errors.

The objects of the invention are achieved by defining several signal levels to be used in the serial interface and by allocating distinctive signal levels for actual data and control information.

A serial interface transmitter according to the invention is characterized in that it comprises
   primary transmitter means for converting a serial sequence of data bits into successive data signal levels in an output line, said data signal levels being selected from a first group of levels and
secondary transmitter means for converting synchronization signals into synchronization signal levels on said output line, said synchronization signal levels being selected from a second group of levels which consists of different levels than said first group of levels.

A serial interface receiver according to the invention is characterized in that it comprises
primary receiver means, responsive to a first group of signal levels, for converting a sequence of successive data signal levels in an input line into a serial sequence of data bits and
   secondary receiver means, responsive to a second group of signal levels which consists of different levels than said first group of signal levels, for converting synchronization signal levels in said input line into synchronization signals.

An electronic device according to the invention comprises a first circuit element and a second circuit element for processing digital image data consisting of data sequences and synchronization signals. It is characterized in that it comprises within the first circuit element a digital transmitting device of the above-mentioned kind and within the second circuit element a digital receiving device of the above-mentioned kind.

The invention also applies to a method which is characterized in that it comprises the steps of
   converting a serial sequence of data bits into successive data signal levels in an output line, said data signal levels being selected from a first group of levels, and
   converting synchronization signals into synchronization signal levels on said output line, said synchronization signal levels being selected from a second group of a levels which consists of different levels than said first group of levels.

According to the invention the transmitter and receiver sides of the serial part of an interface are designed so that several distinctive set levels are allowed on the serial line(s). At least one of the set levels is used to transmit the set values belonging to the actual information, and at least one other set level is used to superimpose the control information onto the actual information.

A piece of control information may be transmitted on the serial line without a data bit value being sent simultaneously. In this case the transmission of data has to be interrupted for the time it takes to transmit the piece of control information, and the level and/or polarity of the piece of control information indicates which value the control information has and how it should be interpreted at the receiving end. However, if sufficient resolution is provided at the receiving end, a piece of control information may be transmitted even simultaneously with a piece of actual data, in which case the receiver measures a received level on the serial line and separates from the measurement the control information part and the actual information part.

BRIEF DESCRIPTION OF DRAWINGS

The novel features which are considered as characteristic of the invention are set forth in particular in the appended Claims. The invention itself, however, both as to its construction and its method of operation, together with additional objects and advantages thereof, will be best understood from the following description of specific embodiments when read in connection with the accompanying drawings.

Similar parts in the drawings are denoted with same reference designators.

DETAILED DESCRIPTION OF THE INVENTION

Figure 3:
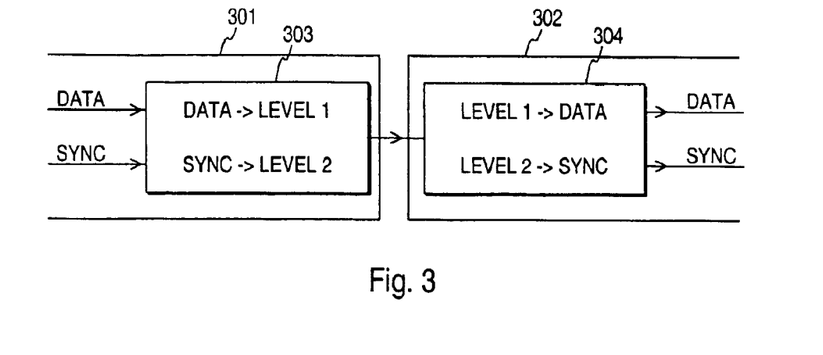
FIG. 3 illustrate the principle of the invention.

FIG. 3 illustrates a serial interfacing principle where a transmitting device 301 is coupled to a receiving device 302 through a wired serial connection. The arrangement is meant to enable the transmission of such digital data where regularly occurring synchronization signals of one or more type divide the data bit stream into subsequent blocks, such as lines and/or frames of digital image data. The transmitting device 301 comprises means 303 for converting the data bit stream with its associated synchronization signals to be transmitted into a signal where a certain first signal level or a certain first set of signal levels are used to indicate the transmitted data bit values and a certain second signal level or a certain second set of signal levels are used to indicate the occurrence and/or type of the synchronization signals. Correspondingly the receiving device 302 comprises means 304 for converting the observed signal levels in a received signal into a data bit stream and its associated synchronization signals so that a certain first observed signal level or a certain first set of observed signal levels are used to reconstruct the transmitted data bit values and a certain second observed signal level or a certain second set of observed signal levels are used to reconstruct the occurrence and/or type of the synchronization signals. The levels refer most commonly to voltage levels, but they may also refer to current levels or the levels of some other measurable quantity.

Figure 4:
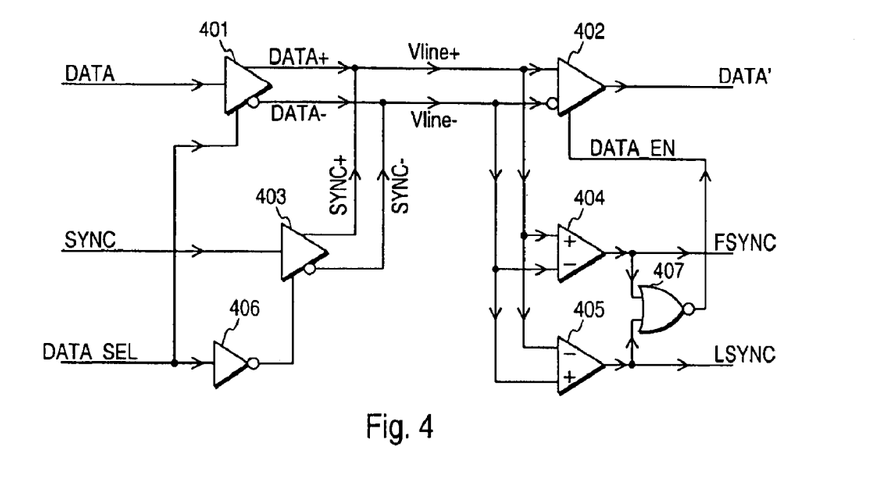
FIG. 4. illustrates an apparatus according to a first embodiment of the invention.

FIG. 4 is a more detailed schematic diagram of a first practical embodiment of the invention. In the transmitting device there is a DATA line carrying a serial data bit stream consisting of the electrical representations of logical values 0 and 1 in a way known as such. Additionally there is a SYNC line which may be set or reset to have a logical value 1 or a logical value 0 respectively. For the sake of example we will assume that a logical value 1 on the SYNC line corresponds to a frame synchronization or FSYNC signal and a logical value 0 on the SYNC line corresponds to a line synchronization or LSYNC signal. If the SYNC line does not have any definite value there is no active synchronization signal at all. The transmitting device comprises also a DATA_SEL line the role of which is described later.

The DATA line is coupled to the data input of a first differential transmitter 401 which has also an enable or select input and a differential output. Similarly the SYNC line is coupled to the data input of a second differential transmitter 403 which has also an enable or select input and a differential output. Although not separately shown in FIG. 4, the second differential transmitter 403 is dimensioned to give a higher output level than the first differential transmitter 401. The differential outputs of the differential transmitters 401 and 403 are coupled together to a differential output line consisting of lines Vline+ and Vline−. The DATA_SEL line is coupled to the enable or select input of the first differential transmitter 401 with direct polarity and to the enable or select input of the second differential transmitter 402 with reverse polarity obtained with an inverter 406.

The receiving device in FIG. 4 comprises a differential receiver 402 having a differential input, an enable or select input and an output. Additionally it comprises a first differential amplifier 404 and a second differential amplifier 405 each having a differential input and an output. The inputs of the differential receiver 402 and the differential amplifiers 404 and 405 are all coupled to the differential input line, consisting of lines Vline+ and Vline−, of the receiving device so that the input of the second differential amplifier 405 has reverse polarity whereas the other inputs have direct polarity. The output of the differential receiver 402 is coupled to a DATA' line, the output of the first differential amplifier 404 is coupled to an FSYNC line and the output of the second differential amplifier 405 is coupled to an LSYNC line. The outputs of the first and second differential amplifiers 404 and 405 are also coupled to the enable or select input of the differential receiver 402 through a NOR gate 407.

Figure 5A:
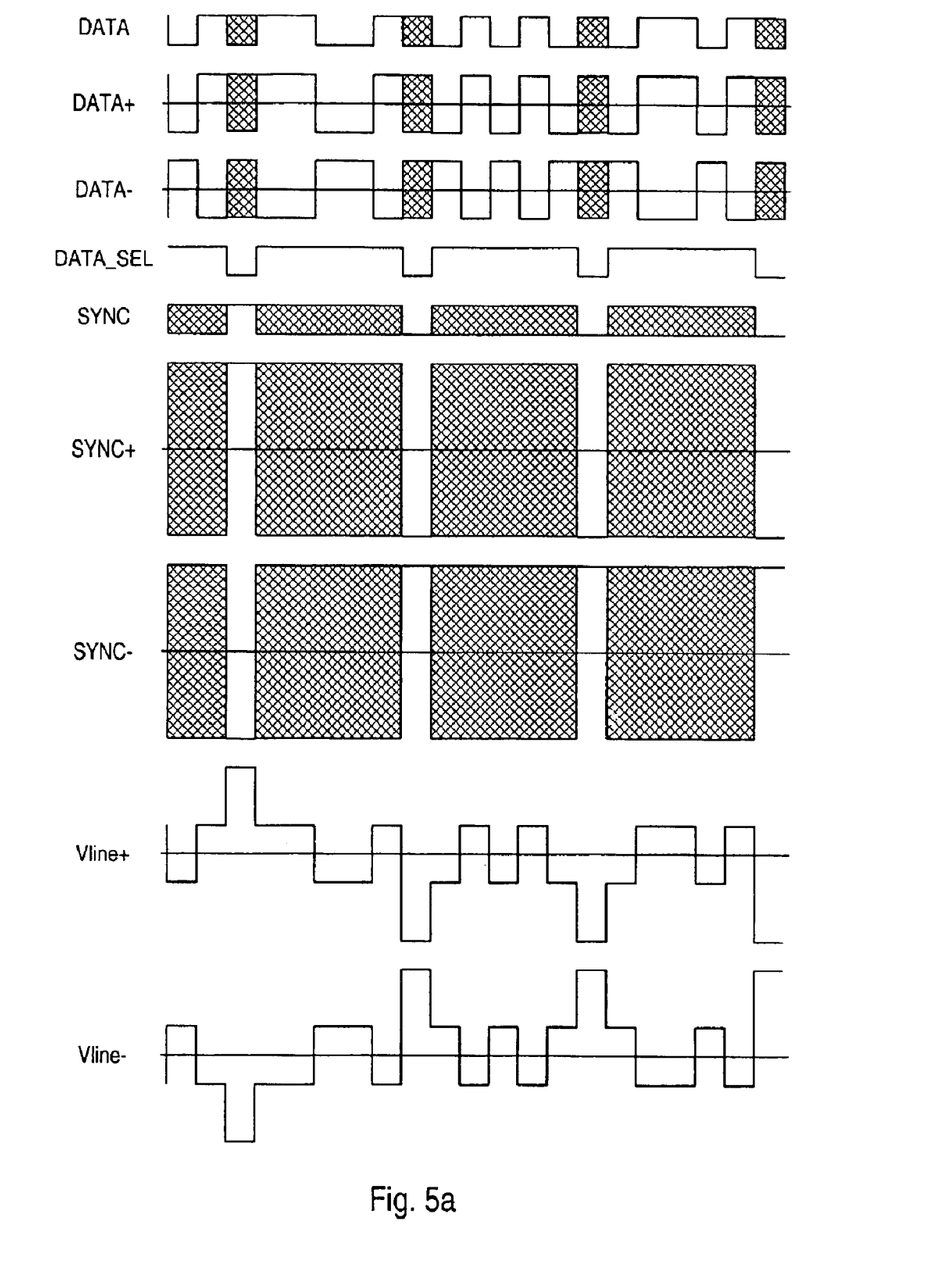
FIG. 5a illustrates a first part of a timing diagram relating to FIG. 4.
Figure 5B:
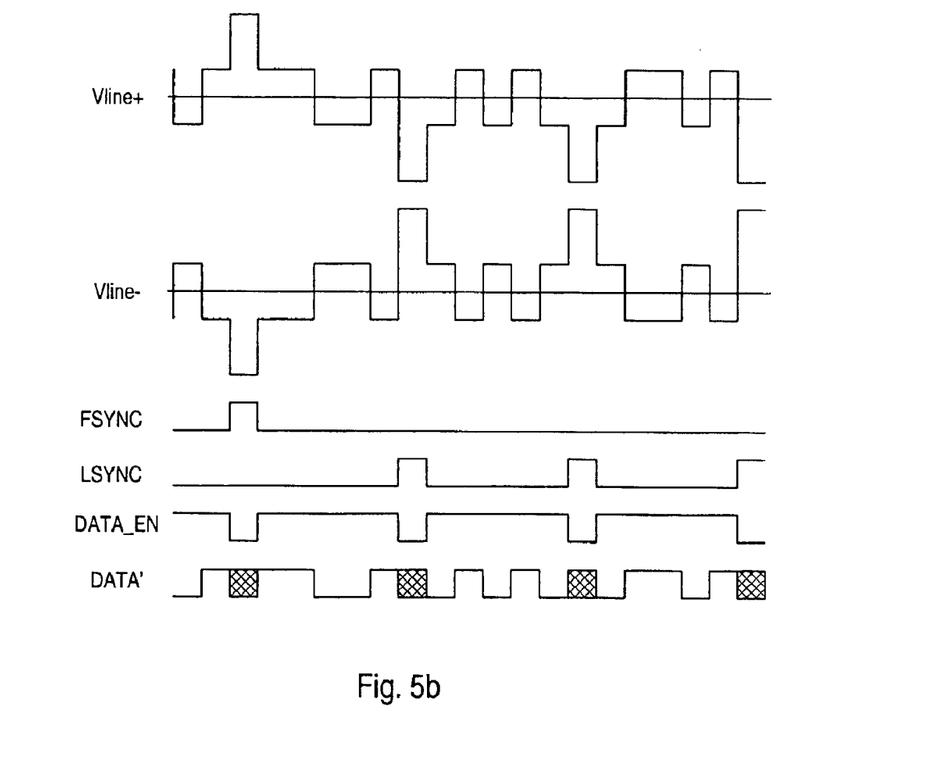
FIG. 5b illustrates a second part of a timing diagram relating to FIG. 4.

The operation of the apparatus in FIG. 4 is illustrated in the timing diagrams of FIGS. 5a and 5b. As long as the DATA_SEL line remains at logical value 1, the first differential transmitter 401 is selected and the second differential transmitter 403 is not selected, so that the logical values 1 and 0 occurring in the data bit stream to be transmitted are converted into voltage signals in the differential output line. The voltage between lines Vline+ and Vline− that is used to transmit the data bits has a certain first level, with direct and reverse polarities corresponding to the logical values 1 and 0 of the data bits respectively. When the DATA_SEL line goes into logical value 0, the first differential transmitter 401 goes into a not selected state and the second differential transmitter 403 goes into a selected state. As a result a synchronization signal is written into the differential output line. Said synchronization signal has a second voltage level that is higher than said first voltage level, and either a direct or reversed polarity according to whether the SYNC line has the logical value 1 (FSYNC) or 0 (LSYNC).

In the receiver the differential amplifiers 404 and 405 have been coupled as level indicators with a certain threshold voltage level, which is higher than said first voltage level. In other words, as long as there are only data signals coming through lines Vline+ and Vline−, the outputs of the differential amplifiers 404 and 405 remain close to zero and the DATA_EN signal remains high. This enables the differential receiver 402 to receive the data bit signals from the lines Vline+ and Vline− and to write the corresponding logical values into the DATA' line. If an FSYNC signal occurs, the first differential amplifier 404 detects it as a voltage level beyond said threshold with direct polarity, and the output of the first differential amplifier 404 goes high while the output of the second differential amplifier 405 remains low. This in turn causes the output of the NOR gate 407 to go low, which disables the differential receiver 402. Nothing gets written into the DATA' line while the FSYNC signal is active. Similarly if an LSYNC signal occurs, the second differential amplifier 405 detects it as a voltage level beyond said threshold with reverse polarity, and the output of the second differential amplifier 405 goes high while the output of the first differential amplifier 404 remains low. This causes again the output of the NOR gate 407 to go low, which disables the differential receiver 402. Nothing gets written into the DATA' line while the LSYNC signal is active.

It is not necessary to disable the differential receiver 402 if somewhere in the other parts of the receiver circuitry it can be made clear that while either one of the synchronization signals remains active, the output on the DATA' line should be ignored. In such a case the NOR gate 407 and the connection from its output to the enable or select input of the differential receiver 402 would be superfluous.

In the embodiment of FIG. 4 the transmission of data bits must be interrupted for the time when synchronization signals are transmitted. The corresponding indefinite values of the DATA, DATA+ and DATA− lines, as well as the DATA' line in the receiver, are shown in FIGS. 5a and 5b as cross-hatched time intervals. Similarly the values of the SYNC, SYNC+ and SYNC− lines are indefininte when no synchronization signals are transmitted (actually, if the differential output of the second differential transmitter 403 has a high enough impedance and the outputs of the differential transmitters 401 and 403 are not separated by e.g. diodes, the SYNC+ and SYNC– lines will follow the voltage levels of the DATA+ and DATA– lines when the SYNC line is indefinite).

Figure 6:
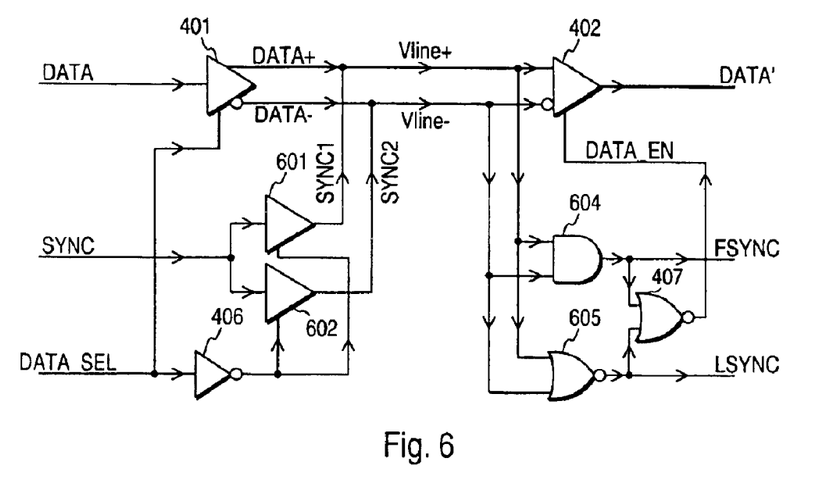
FIG. 6 illustrates an apparatus according to a second embodiment of the invention.

FIG. 6 illustrates an alternative embodiment of the invention which is a variation of the embodiment of FIG. 4. The second differential transmitter has been replaced with a pair of parallel tri-state bus drivers 601 and 602 so that the SYNC line is coupled to the data input of both tri-state bus drivers 601 and 602, the output of the inverter 307 used to reverse the polarity of the DATA_SEL signal is coupled to the enable or select input of both tri-state bus drivers 601 and 602. The output of the first tri-state bus driver 601 is coupled to the Vline+ line and the output of the second tri-state bus driver 602 is coupled to the Vline– line. A tri-state bus driver is a known circuit element which accepts logical levels as input signals and is capable of driving a wired output connection into one of two logical voltage levels correspondingly. When a tri-state bus driver is not selected, its output is at a high impedance state. In FIG. 6 we assume that the output levels of the first differential transmitter 401 are lower than the output levels of the tri-state bus drivers 601 and 602.

The transmitter side in FIG. 6 works otherwise in the same way as that in FIG. 4, but when the DATA_SEL signal goes low, the parallel tri-state bus drivers 601 and 602 couple the same voltage level into the Vline+ and Vline– lines and not opposite levels like the output of a differential transmitter. Taken our previous assumption that a logical 1 on the SYNC line means an FSYNC signal and a logical 0 means an LSYNC signal, an FSYNC signal is transmitted through the Vline+ and Vline– lines by setting both to the same relatively high voltage level, and an LSYNC signal is transmitted through the Vline+ and Vline– lines by setting both to the same relatively low voltage level.

Figure 7A:
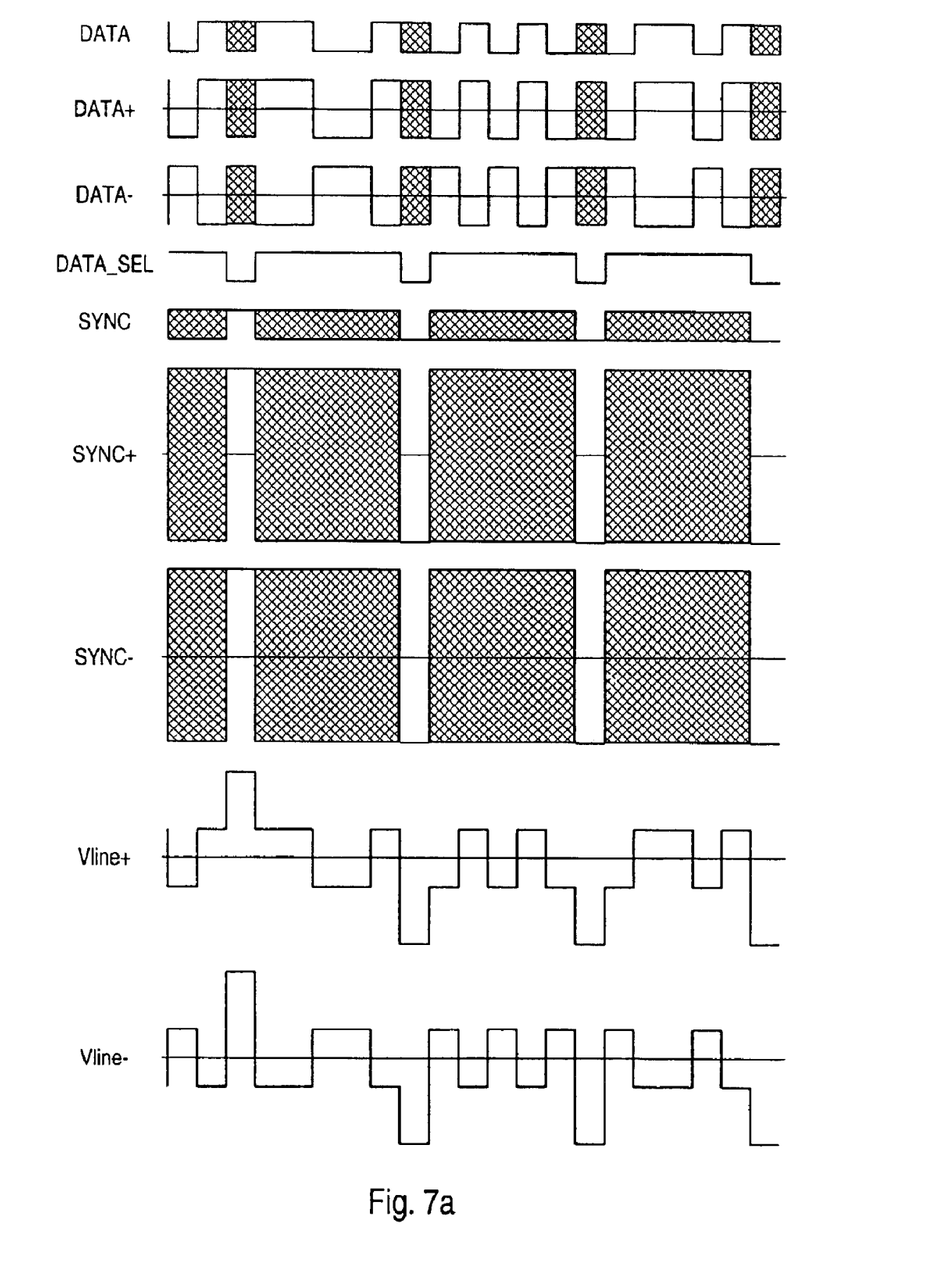
FIG. 7a illustrates a first part of a timing diagram relating to FIG. 6.
Figure 7B:
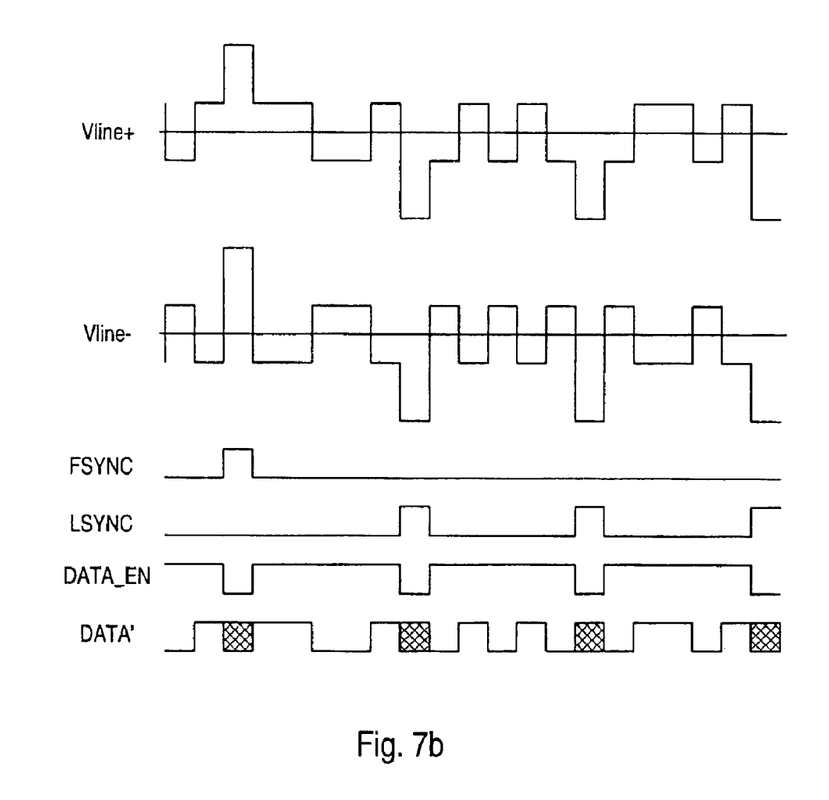
FIG. 7b illustrates a second part of a timing diagram relating to FIG. 6.

On the receiver side of FIG. 6 the differential amplifiers or level indicators of FIG. 4 have been replaced by an AND gate 604 and a NOR gate 605. The outputs of these alp gates are coupled to the FSYNC and LSYNC lines respectively, and also to the enable or select input of the differential receiver 402 through the NOR gate 407. The idea of operation on the receiver side is the same as before: as long as the differential voltage levels used to transmit the data bits over the Vline+ and Vline– lines remain somewhere between the more extreme levels used for the FSYNC and LSYNC signals, the outputs of the logical gates 604 and 605 remain low and the DATA_EN signal remains high. When either one of the more extreme levels occurs, this time simultaneously in both lines Vline+ and Vline–, the output of the appropriate one of the logical gates 604 or 605 goes high, disabling the reception of data by setting the DATA_EN signal low through gate 407, and indicating the respective synchronization signal on the corresponding one of the FSYNC and LSYNC lines. In the timing diagram of FIGS. 7a and 7b cross-hatched time intervals again denote those moments when the value of the corresponding signal is indefinite.

If we compare the embodiments of FIGS. 4 an 6, the one in FIG. 4 is more advantageous in the sense that all signals in the Vline+ and Vline– lines have differential form, reducing the susceptibility to EMI: the high simultaneous voltage levels used in the embodiment of FIG. 6 both increase the interference radiated to the surroundings and make the transmission of the synchronization signals susceptible to common-more interference. However, the embodiment in FIG. 6 makes use of very commonplace and readily available parallel tri-state bus drivers instead of a differential transmitter dimensioned for relatively high output voltage, which may reduce production costs and energy consumption.

Both embodiments shown in FIGS. 4 and 6 share the slight drawback that the transmission of data must be interrupted when a synchronization signal is transmitted. This drawback is not nearly as severe as in prior art solutions, since only one bit period from the transmission per one smallest data unit (line) between consecutive synchronization signals needs to be received. However, the invention enables even continuous transmission of data as will be disclosed in the following description of FIGS. 8 to 11.

Figure 8:
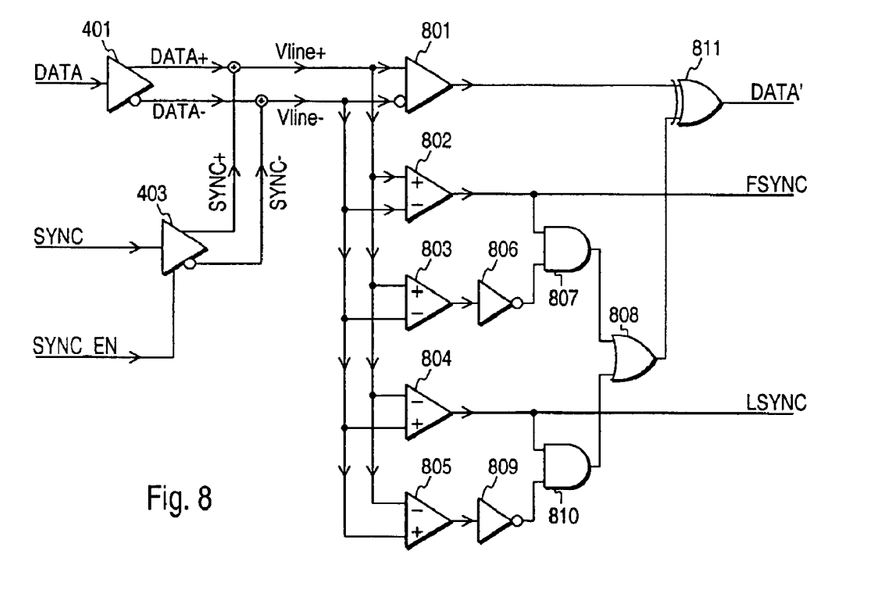
FIG. 8 illustrates an apparatus according to a third embodiment of the invention.

FIG. 8 illustrates an arrangement where the transmitting device comprises a DATA line and a SYNC line exactly as in FIGS. 4 and 6. There is also a third line, but this time it is called SYNC_EN. The first differential transmitter 401 does not have a coupling between said third line and its enable or select input. The SYNC_EN line is coupled directly to the enable or select input of the second differential transmitter 403, which is again dimensioned for higher output levels than the first differential transmitter 401. This time the output level of the second differential transmitter 403 must be higher than two times the output level of the first differential transmitter 401 for reasons described in more detail below. The outputs of the differential transmitters 401 and 403 are coupled to the differential transmission output, consisting of lines Vline+ and Vline–, through summing means so that the voltage of Vline+ will be the sum of voltages of DATA+ and SYNC+, and the voltage of Vline– will be the sum of voltages of DATA– and SYNC–.

In the receiving device there is a parallel receiver arrangement consisting of a differential receiver 801 as well as four parallel differential amplifiers 802, 803, 804 and 805 coupled as level indicators. All these are coupled to the differential transmission input consisting of lines Vline+ and Vline–. The first two differential amplifiers 802 and 803 are coupled to the lines Vline+ and Vline– with direct polarity and the other two differential amplifiers 804 and 805 are coupled to the lines Vline+ and Vline– with reverse polarity. Although not specifically shown in FIG. 8, the relative sensitivities of the differential amplifiers 802 to 805 are selected so that the first and third differential amplifiers 802 and 804 indicate when a differential input signal exceeds a certain first threshold level and the second and fourth differential amplifiers 803 and 805 indicate when a differential input signal exceeds a certain second threshold level which is higher than said first threshold level.

The output of the first differential amplifier 802 is coupled to an FSYNC line and the output of the third differential amplifier 804 is coupled to an LSYNC line. The outputs of the second and fourth differential amplifiers 803 and 805 are coupled to inverters 806 and 809 respectively. The outputs of the first differential amplifier 802 and the first inverter 806 are coupled to a first AND gate 807, and the outputs of the third differential amplifier 804 and the second inverter 809 are coupled to a second AND gate 810. The outputs of the first and second AND gates 807 and 810 are coupled to an OR gate 808. The outputs of the differential receiver 801 and the OR gate 808 are coupled to an exclusive-OR or XOR gate 811, the output of which is coupled to a DATA' line.

In the transmitting device the first differential transmitter 401 transmits continuously a stream of data bits into its differential output consisting of lines DATA+ and DATA–. As long as the SYNC_EN signal remains low, the second differential transmitter 403 is not selected and the voltage in the SYNC+ and SYNC– lines is zero, meaning that the Vline+ and Vline– lines follow the voltages of the DATA+ and DATA– lines respectively. When the SYNC_EN signal goes high, the second differential transmitter 403 sets the voltages of the SYNC+ and SYNC− lines according to the current signal value on the SYNC line. We may again assume that an FSYNC signal corresponds to a high value on the SYNC line and an LSYNC signal corresponds to a low value on the SYNC line.

Let us analyze more carefully the voltages of the Vline+ and Vline− lines depending on the value combinations on the DATA, SYNC and SYNC_EN lines. We may use a notation according to which the output of the first differential transmitter 401 is from −Vth1 to +Vth1. As described above, if the SYNC_EN signal is low, these are also the voltages of the Vline+ and Vline− lines. Taken that the second differential transmitter 403 is dimensioned to give a higher output voltage level than two times that of the first differential transmitter 401, we may note that e.g. if DATA is low and SYNC and SYNC_EN both are high, then the voltage of Vline+ is equal to some +Vth2, which is higher than said +Vth1, and the voltage of Vline− is equal to some −Vth2, which is lower than said −Vth1. If DATA, SYNC and SYNC_EN are all high, then the voltage of Vline+ is equal to some +Vth3, which is even higher than said +Vth2, and the voltage of Vline− is equal to some −Vth3, which is even lower than said −Vth2. For completeness we may show all possible combinations in the following table.

|  | DATA | SYNC | SYNC_EN | Vline+ | Vline− |
|---|---|---|---|---|---|
| DATA high, no SYNC | 1 | X | 0 | +Vth1 | −Vth1 |
| DATA low, no SYNC | 0 | X | 0 | −Vth1 | +Vth1 |
| DATA high, FSYNC | 1 | 1 | 1 | +Vth3 | −Vth3 |
| DATA low, FSYNC | 0 | 1 | 1 | +Vth2 | −Vth2 |
| DATA high, LSYNC | 1 | 0 | 1 | −Vth2 | +Vth2 |
| DATA low, LSYNC | 0 | 0 | 1 | −Vth3 | +Vth3 |

Figure 9A:
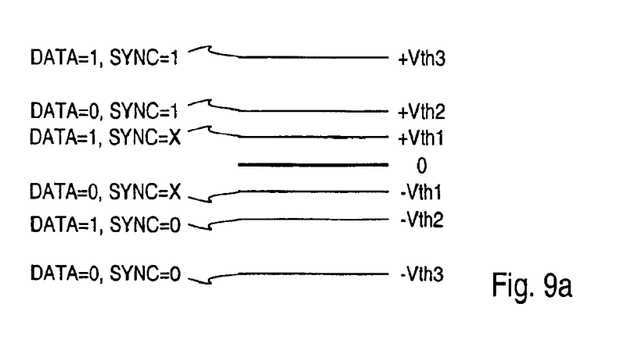
FIG. 9a illustrates a voltage level diagram relating to FIG. 8.

These signal combinations and voltage levels are also shown in FIG. 9a.

In the receiving device the first differential amplifier 802 is arranged to detect a positive voltage difference equal to or greater than +Vth2 . . . −Vth2 in the differential input line: the presence of such a positive voltage difference indicates an FSYNC signal. Simultaneously with the FSYNC signal there may come a data bit that is either 1 or 0, and the receiver must be able to distiguish between these cases. Therefore the second differential amplifier 803 is arranged to detect a positive voltage difference equal to +Vth3 . . . −Vth3 in the differential input line. If such a positive voltage difference is present, the simultaneous data bit is 1. If, however, such a large positive voltage difference is not present, the simultaneous data bit is 0. The circuit consisting of the first inverter 806, the first AND gate 807 and the OR gate 808 is designed to give a 1 to the second input of the XOR gate 811 if the detected positive voltage difference is equal to or greater than +Vth2 . . . −Vth2, but not as large as +Vth3 . . . −Vth3 so that in that case the 1 given by the differential receiver 801 is inverted to 0 before writing it into the DATA' line. A similar deduction concerning the parts 804, 805, 809, 810 and 808 leads to the result that LSYNC is indicated every time when a negative voltage difference equal to or greater than −Vth2 . . . +Vth2 is detected in the differential input line, and the 0 given by the differential receiver 801 is inverted to 1 before writing it into the DATA' line if the negative voltage difference is not as large as −Vth3 . . . +Vth3.

Figure 9B:
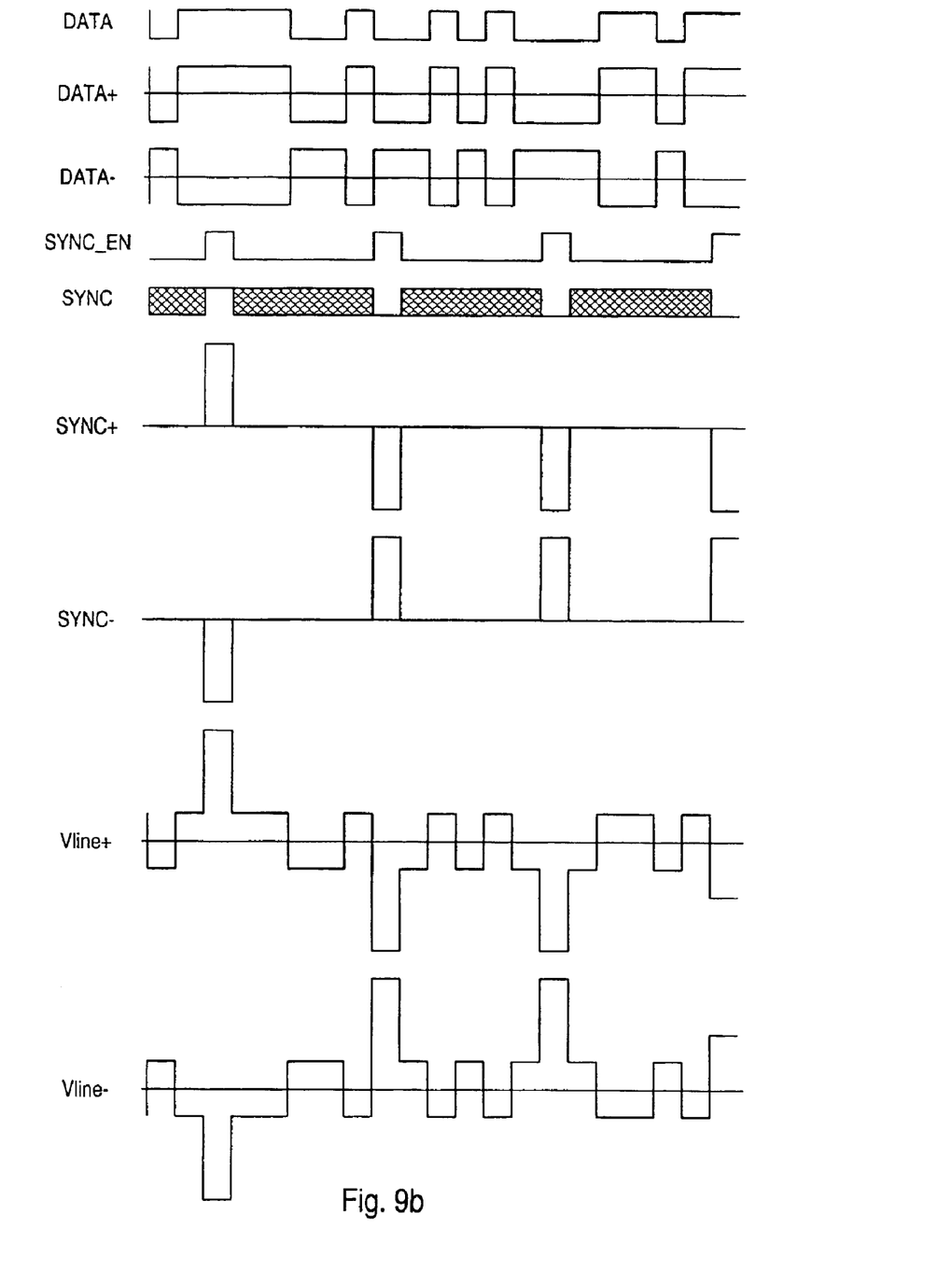
FIG. 9b illustrates a first part of a timing diagram relating to FIG. 8.
Figure 9C:
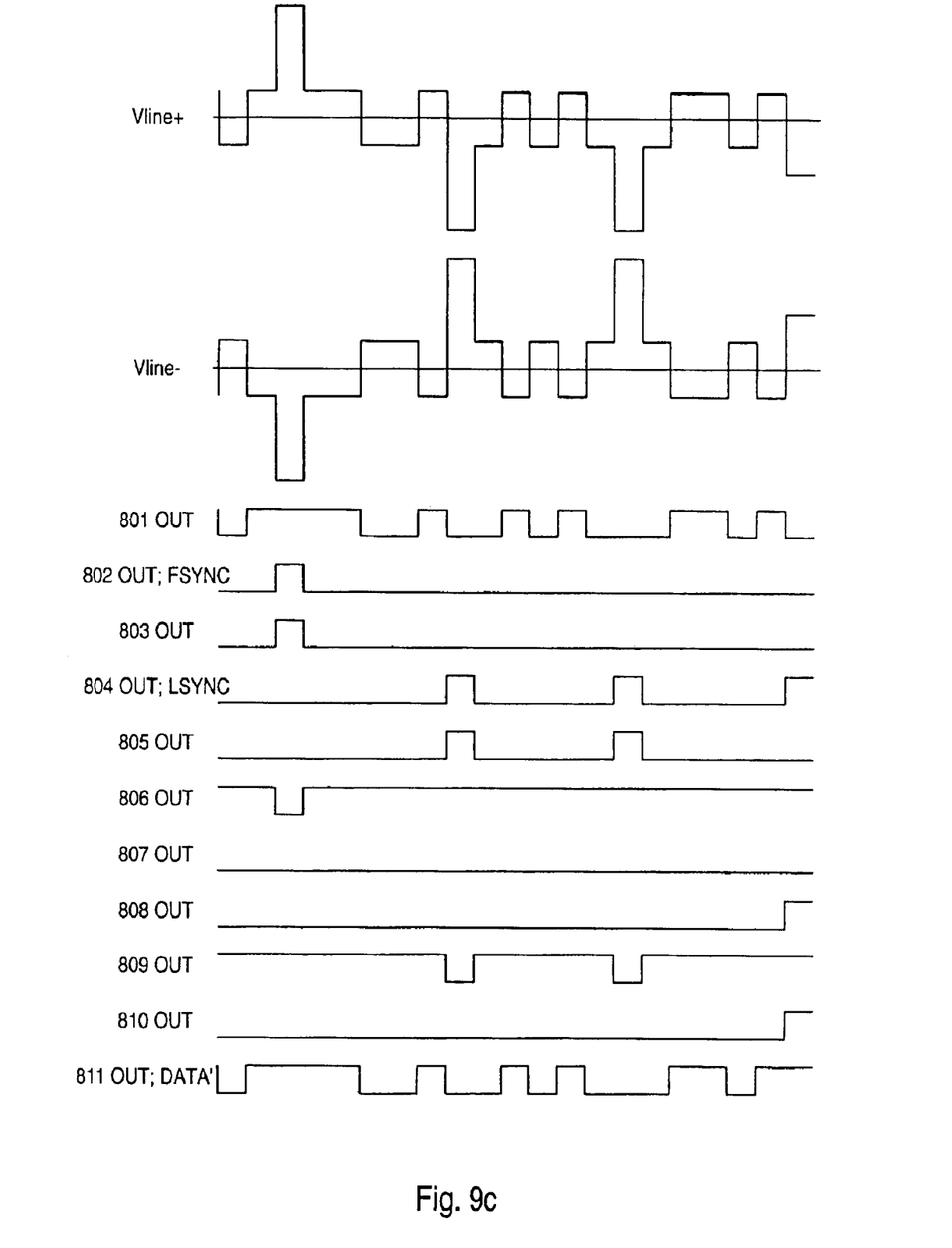
FIG. 9c illustrates a second part of a timing diagram relating to FIG. 8.

FIGS. 9b and 9c present a timing diagram where the difference between the second and last LSYNC pulses illustrate the inverting function implemented with parts 804, 805, 809, 810, 808 and 811.

Figures 10, 11:
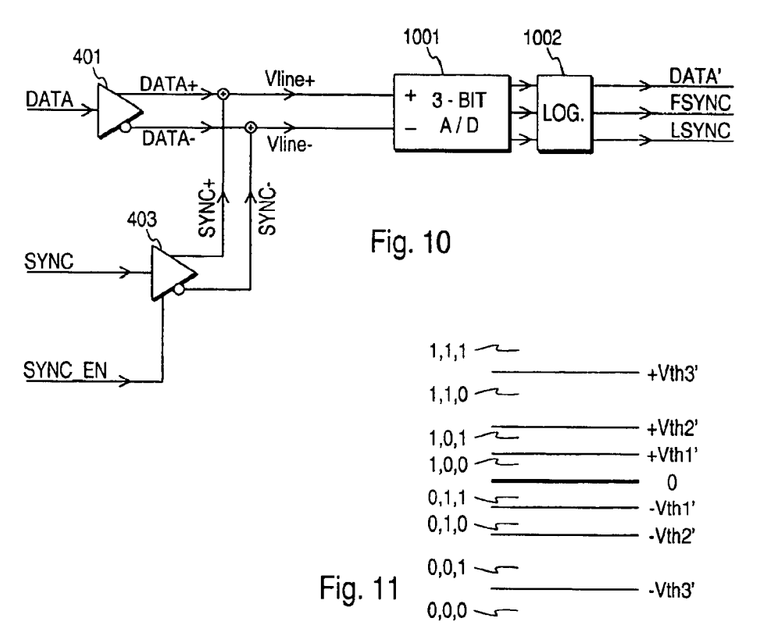
FIG. 10 illustrates an apparatus according to a fourth embodiment of the invention.
FIG. 11 illustrates a voltage level diagram relating to FIG. 10.

FIG. 10 illustrates an embodiment of the invention which is altenative to that of FIG. 8. The transmitting device is equal, but the arrangement of parallel differential receivers and amplifiers in the receiving device as well as the associated logic circuitry have been replaced with a three-bit analogue to digital converter 1001 and a logic block 1002. FIG. 11 illustrates an examplary way how a voltage scale from below −Vth3' to above +Vth3' can be arranged into discrete voltage ranges: the lowest range, below −Vth3', is mapped into bit combination 0,0,0; the next lowest into bit combination 0,0,1; and so on until the highest voltage range, over +Vth3', is mapped into bit combination 1,1,1. Note that the primed threshold voltage values are twice as large as the previously used unprimed ones, since the differential input of the analogue to digital converter is floating and no reference to zero or ground potential is used. In order to produce the correct combinations of DATA', FSYNC and LSYNC signals from the indicated analog to digital mappings the logic block 1002 must do the conversions shown in the following table.

| Output of A/D converter | Output of logic block (DATA', FSYNC, LSYNC) |
|---|---|
| 0,0,0 | 0,0,1 |
| 0,0,1 | 0,0,1 |
| 0,1,0 | 1,0,1 |
| 0,1,1 | 0,0,0 |
| 1,0,0 | 1,0,0 |
| 1,0,1 | 0,1,0 |
| 1,1,0 | 1,1,0 |
| 1,1,1 | 1,1,0 |

It is obvious as such for a person skilled in the art to construct the logic block 1002 so that it does the required conversions.

It is naturally possible to use the parallel tri-state bus driver solution shown in FIG. 6 also in the embodiments shown in FIGS. 8 and 10, with approximately the same influence to the advantageous and disadvantageous effects that have to be taken into consideration. Based on the above-given teachings it is obvious for a person skilled in the art how the detection arrangement in the receiving device must be modified if the synchronization signals come as equal voltage levels on both lines Vline+ and Vline− instead of voltage levels having opposite polarities. In the embodiments shown in FIGS. 8 and 10 another possible modification of the invention is the one where the synchronization signals are set for a longer time than one bit period. This would not only reduce the risk of a synchronization signal going unnoticed because of a sudden and short communication error, but it would also give the possibility to transmit several different, synchronization and/or other control signals that differ from each other by their duration in time. The receiving device should in such a case have a counter that would count the length in bit periods of each received synchronization signal and map the counted lengths into appropriate different synchronization indications.

In the described embodiments we have only used two synchronization signals, namely FSYNC and LSYNC. However, the invention is not limited to the use of two synchronization signals, because each additional pair of synchronization signals can be accommodated by providing an additional differential transmitter (or parallel tri-state bus driver pair) in the transmitting device and an additional detection arrangement obtained from the described embodiments by obvious extrapolation in the receiving device. Instead of using separate differential transmitters for all signals that require different signal levels it would be possible to use a single controllable differential transmitter the amplification factor of which could be set separately for each type of signal to be transmitted.

The invention reduces the risk of losing synchronization, because even if a cycle or even a number of cycles from a data bit sequence between synchronization signals is lost, the detection of the next synchronization signal will succeed because it is completely independent of the detection of data bits. For the receiver it suffices to monitor the signal levels and to detect the next occurrence of a signal level that is not one of the usual data signal levels to achieve synchronization. Although we have described only embodiments where the synchronization signals are transmitted generally on higher signal levels than the data bits, it is perfectly possible to switch the roles of the levels so that the data bits are transmitted on a higher level than the synchronization signals. However, because there are much more data bits than synchronization signals to be transmitted, it is usually more advantageous to use the lower signal levels for the data bits since this helps to reduce energy consumption and EMI originating at the serial interface.

Figure 12:
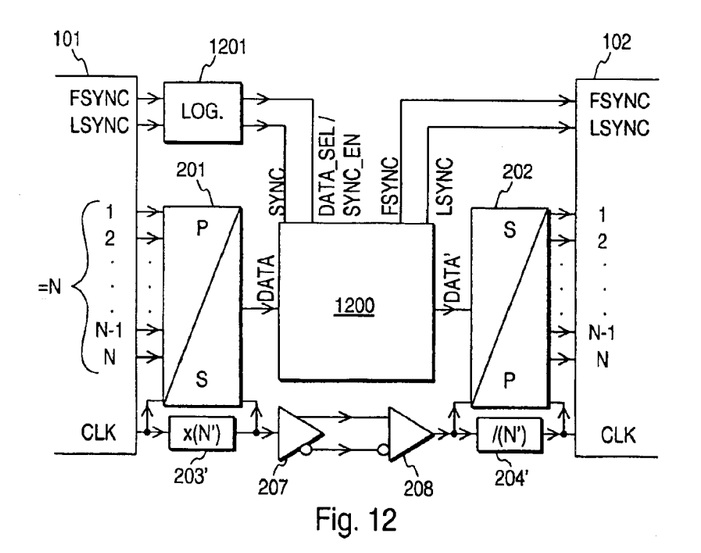
FIG. 12 illustrates use of an embodiment of the invention according to FIG. 4, 6, 8 or 10.

FIG. 12 illustrates the use of an arrangement according to FIG. 4, 6, 8 or 10 as a comparison to FIG. 2a where a prior art arrangement was described. The serial interface arrangement according to the invention is generally represented by block 1200. There is an additional logic block 1201 the function of which is to map the LSYNC and FSYNC signals given by the data originator 201 into SYNC and DATA_SEL or SYNC_EN signals: the mapping is easily done since DATA_SEL must remain high and SYNC must remain indefinite as long as LSYNC and FSYNC are low, and when one of LSYNC and FSYNC is high DATA_SEL must go low and SYNC must be either high or low depending on which one of LSYNC and FSYNC is high. If SYNC_EN is used instead, it must be low as long as LSYNC and FSYNC are low and high otherwise. The logic circuit that fulfils these functions only needs to comprise a couple of basic ports.

The clock signal multiplier and divider blocks 203' and 204' deserve some additional attention. In those embodiments of the invention where a synchronization signal replaces the transmission of data bits the clocking arrangement must take into account the fact that the transmission frequency is not an exact multiple of the parallel data processing frequency by the number of parallel data lines. Either the clock signal must be interrupted for the duration of a synchronization signal to be transmitted or the multiplier/divider number must be variable or so selected that the synchronization signals can be accommodated between the transmitted data bits without the parallel to serial and serial to parallel conversions either running ahead of the serial transmission pace or lagging behind it. In those embodiments of the invention where the synchronization signals are superimposed with data bits the clock frequency for the parallel to serial and serial to parallel conversions is simply the multiple of the parallel data processing frequency by the number of parallel data lines.

If the invention is applied to a portable terminal of a telecommunication system, the transmitting device 201 may be e.g. a camera, in which case the receiving device 202 may be e.g. a frame memory. Or the transmitting device 201 may be a frame memory and the receiving device 202 may be a display.

What is claimed is:

1. A digital transmitting device for transmitting a serial sequence of data bits and a number of associated synchronization signals over a wired connection to a digital receiving device, comprising:
   primary transmitter means for converting a serial sequence of data bits into successive data signal levels in an output line, said data signal levels being selected from a first group of levels, and
   secondary transmitter means for converting synchronization signals into synchronization signal levels on said output line, said synchronization signal levels being selected. from a second group of levels which consists of different levels than said first group of levels, and
   wherein said digital transmitting device and said digital receiving device are part of a portable terminal of a telecommunications system, and said output line from said primary transmitter means leads to said digital receiving device.

2. A digital transmitting device according to claim 1, comprising means for disabling the output of data signal levels into said output line for the time of outputting synchronization signal levels into said output line.

3. A digital transmitting device for transmitting a serial sequence of data bits and a number of associated synchronization signals over a wired connection, comprising:
   primary transmitter means for converting a serial sequence of data bits into successive data signal levels in an output line, said data signal levels being selected from a first group of levels,
   secondary transmitter means for converting synchronization signals into synchronization signal levels on said output line, said synchronization signal levels being selected from a second group of revels which consists of different levels than said first group of levels,
   means for disabling the output of data signal levels into said output line for the time of outputting synchronization signal levels into said output line, and wherein
   said primary transmitter means comprise a first transmitter having a data input, an output and an enable or select input,
   said secondary transmitter means comprise a second transmitter having a data input, an output and an enable or select input,
   the digital transmitting device comprises a selection signal line, and
   said selection signal line is coupled to the enable or select input of said first transmitter with direct polarity and to the enable or select input of said second transmitter with reverse polarity.

4. A digital transmitting device according to claim 2, wherein
   said primary transmitter means and said secondary transmitter means are implemented as complementary modes of a single controllable transmitter having a control input to control its amplification factor,
   the digital transmitting device comprises a control signal line, and
   said control signal line is coupled to the control input of said single controllable transmitter.

5. A digital transmitting device according to claim 1, comprising means for summing the outputs of said primary transmitter means and said secondary transmitter means into combined output signal levels in said output line.

6. A digital transmitting device for transmitting a serial sequence of data bits and a number of associated synchronization signals over a wired, comprising:

primary transmitter means for converting a serial sequence of data bits into successive data signal levels in an output line said data signal levels being selected from a first group of levels, secondary transmitter means for converting synchronization signals into synchronization signal levels on said output line, said synchronization signal levels being selected from a second group of levels which consists of different levels than said first group of levels, and wherein said output line is a differential wired connection consisting of a first signal line and a second signal line, and said primary transmitter means is a low-voltage level differential transmitter.

7. A digital transmitting device according to claim 6, wherein said secondary transmitter means is a differential transmitter having differential output levels that are remarkably farther from zero than the output levels of said low-voltage level differential transmitter.

8. A digital transmitting device according to claim 6, wherein said secondary transmitter means comprises a pair of parallel tri-state bus drivers having non-differential output levels that are remarkably farther from zero than the output levels of said low-voltage level differential transmitter.

9. A digital receiving device for receiving a serial sequence of data bits and a number of associated synchronization signals over a wired connection from a digital transmitting device, comprising:

primary receiver means, responsive to a first group of signal levels, for converting a sequence of successive data signal levels in an input line into a serial sequence of data bits, and secondary receiver means, responsive to a second group of signal levels which consists of different levels than said first group of signal levels, for converting synchronization signal levels in said input line into synchronization signals, and wherein said digital transmitting device and said digital receiving device are part of a portable terminal of a telecommunications system, and said input line to said primary receiver means leads from said digital transmitting device.

10. A digital receiving device for receiving a serial sequence of data bits and a number of associated synchronization signals over a wired connection, comprising:

primary receiver means, responsive to a first group of signal levels, for converting a sequence of successive data signal levels in an input line into a serial sequence of data bits, secondary receiver means, responsive to a second group of signal levels which consists of different levels than said first group of signal levels, for converting synchronization signal levels in said input line into synchronization signals, and wherein said primary receiver means is a low-voltage level differential receiver responsive to voltage signals at a certain first distance from zero, and said secondary receiver means comprises two parallel differential amplifiers coupled as level indicators to said input line with opposite polarities and responsive to voltage signals at a certain second distance from zero, which is larger than said first distance.

11. A digital receiving device according to claim 10, comprising:

an enable or select input in said low-voltage level differential receiver, and a coupling from the outputs of said parallel differential amplifiers to said enable or select input arranged to disable said low-voltage level differential receiver as a response to an affirmative level indication from either one of said parallel differential amplifiers.

12. A digital receiving device according to claim 10, wherein said secondary receiver means comprises also two other parallel differential amplifiers coupled as level indicators to said input line with opposite polarities and responsive to voltage signals at a certain third distance from zero, which is larger than said second distance, said four parallel differential amplifiers constitute two differential amplifier pairs so that in each pair the differential amplifiers are coupled as level indicators to said input line with same polarity but responsive to voltage signals at a different distance from zero, the digital receiving device comprises additionally inverting means for conditionally inverting the output of said low-voltage level differential receiver as a response to a certain indication, and from each differential amplifier pair there is a coupling to said inverting means for producing said indication as a response to a situation where exactly one of the amplifiers in the differential amplifier pair gives an affirmative level indication.

13. A digital receiving device according to claim 9, wherein said primary receiver means and said secondary receiver means are implemented within a mapping entity arranged to map a number of input signal levels into corresponding bit combinations where the reception of signal levels belonging to said first group of signal levels corresponds to different bit combinations than the reception of signal levels belonging to said second group of signal levels.

14. A digital receiving device according to claim 13, wherein said mapping entity consists of an analog to digital converter and an associated logic block.

15. A portable terminal of a telecommunications system comprising a first circuit element and a second circuit element for processing digital image data consisting of data sequences and synchronization signal, comprising:

within the first circuit element a digital transmitting device for transmitting a-serial sequence of data bits and a number of associated synchronization signals over a wired connection, said digital transmitting device comprising:

primary transmitter means for converting a serial sequence of data bits into successive data signal levels in an output line, said data signal levels being selected from a first group of levels, and secondary transmitter means for converting synchronization signals into synchronization signal levels on said output line, said synchronization signal levels being selected from a second group of levels which consists of different levels than said first group of levels; and within the second circuit element a digital receiving device for receiving a serial sequence of data bits and a number of associated synchronization signals over a wired connection, said digital receiving device comprising:

primary receiver means, responsive to a first group of signal levels, for converting a sequence of successive data signal levels in an input line into a serial sequence of data bits, and secondary receiver means, responsive to a second group of signal levels which consists of different levels than said first group of signal levels, for converting synchronization signal levels in said input line into synchronization signals, and wherein said output line from said primary transmitter means leads to said input line of said primary receiver means.

16. A method for transmitting a serial sequence of data bits and a number of associated synchronization signals over a wired connection from a digital transmitting device to a digital receiving device of a telecommunications system, comprising the steps of:

converting a serial sequence of data bits into successive data signal levels in an output line, said data signal levels being selected from a first group of levels, and converting synchronization signals into synchronization signal levels on said output line, said synchronization signal levels being selected from a second group of levels which consists of different levels than said first group of levels, and wherein the transmitting of the serial sequence of data bits and the number of associated synchronization signals over the wired connection takes place within a portable terminal of the telecommunications system, and said wired connection comprises said output line.

17. A method according to claim 16, wherein, as a part of the step of converting synchronization signals into synchronization signal levels on said output line, the simultaneous conversion of data bits into successive data signal levels in said output line is disabled so that synchronization signal levels and data signal levels only occur alone in said output line.

18. A method according to claim 16, wherein, as a part of the step of converting synchronization signals into synchronization signal levels on said output line, the simultaneous conversion of data bits into successive data signal levels in said output line is upheld so that synchronization signal levels and data signal levels occur in superposition in said output line.

19. A digital transmitting device for transmitting a serial sequence of data bits and a number of associated synchronization signals over a wired connection, comprising;

primary transmitter means for converting a serial sequence of data bits into successive data signal levels in an output line, said data signal levels being selected from a first group of levels;

secondary transmitter means for converting synchronization signals into synchronization signal levels on said output line, said synchronization signal levels being selected from a second group of levels which consists of different levels than said first group of levels; and selection means connected to enable terminals of said primary and said secondary transmitters for enabling said primary and said secondary transmitters alternately with one of said transmitters being enabled while the other of said transmitters is disabled.

20. An interface between first and second components of a telecommunications system wherein the first component is a digital transmitting device that comprises a primary transmitter means and a secondary transmitter means, and the second component is a digital receiving device, the interface comprising:

primary transmitter means for converting a serial sequence of data bits into successive data signal levels in an output line connecting with said digital receiving device, said data signal levels being selected from a first group of levels; and secondary transmitter means for converting synchronization signals into synchronization signal levels on maid output line, said synchronization signal levels being selected from a second group of levels which consists of different levels than said first group of levels to attain reduction of signal power and reduction of electromagnetic interference, and wherein said first arid said second components are located within a portable terminal of the telecommunications system, and said output line from said primary transmitter means leads to said digital receiving device.

* * * * *